United States Patent [19]

Wakase

[11] Patent Number: 4,478,313
[45] Date of Patent: Oct. 23, 1984

[54] SPRING POWERED PRIME MOVER
[75] Inventor: Hiroshi Wakase, Tokyo, Japan
[73] Assignee: Takara Co., Ltd., Tokyo, Japan
[21] Appl. No.: 220,566
[22] Filed: Dec. 29, 1980
[30] Foreign Application Priority Data Dec. 27, 1979 [JP] Japan .................. 54-182943[U]

[51] Int. Cl.³ .................. F03G 1/00; A63H 29/04; A63H 31/00
[52] U.S. Cl. .................. 185/39; 74/406; 185/45; 185/DIG. 1; 267/156
[58] Field of Search .......... 46/206; 74/406; 185/37, 185/39, 45, DIG. 1; 267/156

[56] References Cited

U.S. PATENT DOCUMENTS

| 3,097,634 | 7/1963 | Wehner | 185/39 X |
| 3,798,831 | 3/1974 | Higashi | 46/206 |
| 4,192,093 | 3/1980 | Hamano | 46/206 |
| 4,241,534 | 12/1980 | Larsson et al. | 46/206 |
| 4,261,437 | 4/1981 | Zavatkay et al. | 185/45 |

FOREIGN PATENT DOCUMENTS

| 2019085 | 3/1973 | Fed. Rep. of Germany. |
| 2105734 | 6/1976 | Fed. Rep. of Germany. |
| 2461456 | 7/1976 | Fed. Rep. of Germany. |
| 97144 | 12/1922 | Switzerland .................. 185/45 |

Primary Examiner—Allan D. Herrmann
Attorney, Agent, or Firm—Jackson, Jones & Price

[57] ABSTRACT

An improved spring-wound prime mover provides a housing cavity that can automatically fix one end of a spring upon insertion. The gear train includes individual gears that automatically provide a first gear ratio for storing energy and a second gear ratio for releasing energy. The prime mover is assembled with a friction fitting arrangement to simplify manufacturing.

8 Claims, 8 Drawing Figures

FIG. 5
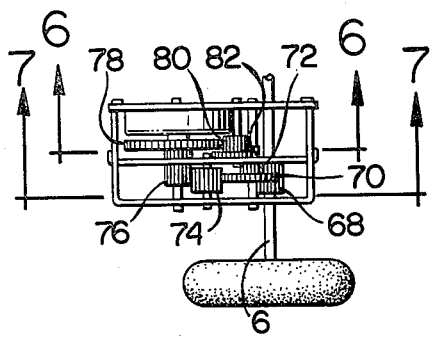
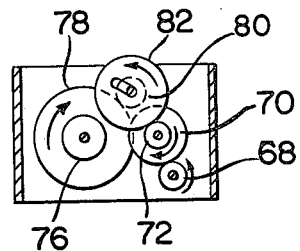
FIG. 6
DRIVE
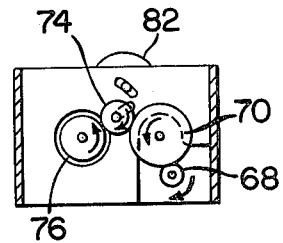
FIG. 7
WIND UP
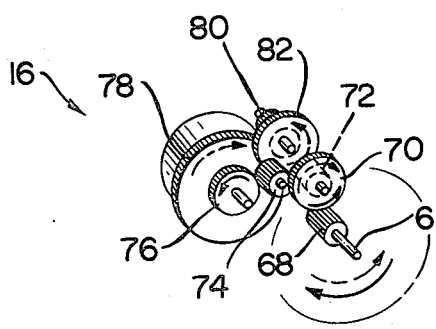
FIG. 8

SPRING POWERED PRIME MOVER

BACKGROUND OF THE INVENTION

1. Field of the Invention

The present invention is directed to the toy field and more particularly, to a spring powered prime mover which is capable of providing a driving force for toys, such as toy vehicles.

2. Description of the Prior Art

Numerous forms of spring powered prime movers have been used in the toy industry to drive toy vehicles. Every child is familiar with a spring driven toy vehicle. Frequently, the spring drive is powered by a key which stores energy by tightening a spring band into a tensioned coiled condition. Usually, a series of gears alone or in combination with a flywheel are utilized to transmit the released stored energy from the spring into rotational motion for the driving of wheels on the toy vehicle.

As can be readily appreciated, the economics of the toy business require the spring motor to be relatively inexpensive. In this regard, the toy industry has utilized a spring powered motor wherein one end of the spring band extends through and is affixed to an opening in a metal housing wall. Generally, the housing wall is made of a soft metal having tabs that can be bent to form a rectangular housing configuration. A gear train is appropriately mounted within the housing wall to drive an output shaft. Usually, when the spring is mounted, it must be cut with notches to fit within an aperture in the housing wall. These notches provide a weak point in the spring and frequently permit the fracturing of the spring and release from its anchoring position upon overtensioning by accident.

With the general increase in labor cost around the world, the prior art is seeking a new and improved low cost spring wound prime mover that is equal to or superior to the prior art devices heretofore used.

SUMMARY OF THE INVENTION

The present invention comprises a spring wound prime mover that is capable of driving toys and the like. A housing member is provided and supports an output shaft rotatably mounted to the housing member. A cavity in a wall of the housing member has appropriate notches or recesses to co-act with an outer circumferential portion of the spring member for anchoring the same to the housing member. This spring member can be inserted into the recessed cavity without any requirement of alignment and provides a positive and easily assembled anchoring configuration. The other end of the spring member is designed to be moved for use in storing and releasing energy ultimately to an output shaft. A gear train assembly is connected to the spring member and to the output shaft and is capable of providing both a relatively high and a relatively low gear ratio. The gear train assembly can include a first gear that is movably mounted to be automatically forced into engagement when energy is being stored in the spring member. For example, the output shaft can be driven by an external force and the first gear can be engaged to provide a high gear ratio for moving the spring member to store energy. The first gear is automatically forced out of engagement when the spring member drives the output shaft. A second gear is also movably mounted to be automatically forced into engagement when the spring member drives the output shaft to provide a low gear ratio and conversely, is automatically forced out of engagement when the output shaft is driven by an external force for moving the spring member to store energy.

The features of the present invention, which are believed to be novel, are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 5 is a schematic plan view of one embodiment of the present invention showing the gear train arrangement;

FIG. 6 is a side schematic cross sectional view of the gear train in a drive arrangement;

FIG. 7 is a side schematic cross sectional view of the gear train assembly storing emergy by winding the spring, and FIG. 8 is a schematic cross sectional view of the gear train arrangement.

DESCRIPTION OF THE PREFERRED EMBODIMENTS

The following description is provided to enable any person skilled in the toy field to make and use the invention and sets forth the best modes contemplated by the inventor for carrying out his invention. Various modifications, however, will remain readily apparent to those skilled in the toy field, since the generic principles of the present invention have been defined herein specifically to provide a relatively economical and easily manufactured spring wound prime mover for use as a spring motor for toys.

Figure 1:
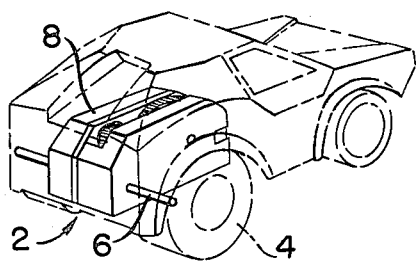
FIG. 1 is a partially phantomed perspective view of a prime mover mounted in a toy vehicle.

Referring to FIG. 1, a partially phantomed perspective view of a toy vehicle incorporating the spring wound prime mover 2 of the present invention is disclosed. The exterior configuration of the housing is preferably made of a plastic material such as polyethylene, nylon, etc., possessing a slight degree of resiliency. A pair of rear wheels 4 are mounted on an output shaft 6. The exterior configuration of the housing member 8 can be further provided with fastening ears, recesses, tabs, etc., to facilitate a snap mounting within the body of the vehicle. When viewing the vehicle from the front with the prime mover 2 appropriately mounted, the housing member 8 comprises a right hand side shell 10, an intermediate plate 12, and a left hand side shell 14. The intermediate plate 12 provides both axle and gear bearing holes and cam surfaces and physically divides a gear train assembly 16.

Figure 4:
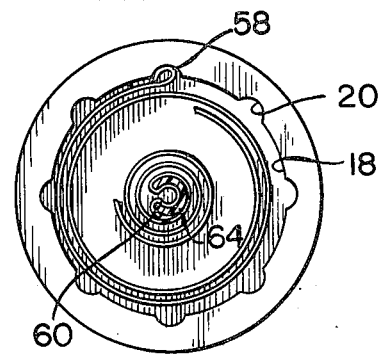
FIG. 4 is a side view of the spring mounted in the recessed cavity of the housing.
Figure 2:
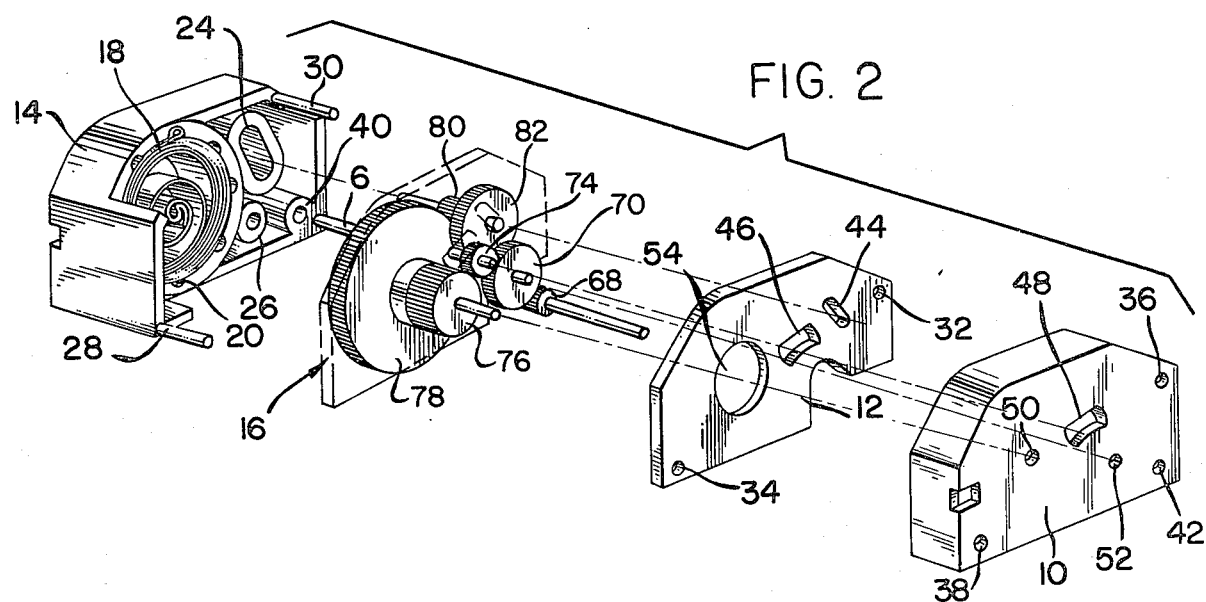
FIG. 2 is an exploded perspective view of the prime mover.
Figure 3:
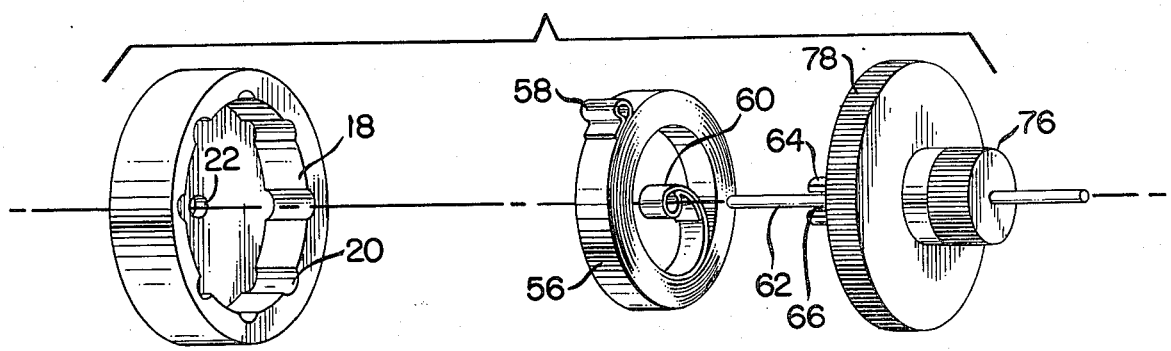
FIG. 3 is an exploded perspective view of the spring housing, spring, and gear connection to the spring.

Shell 14 is molded from plastic material and includes a recessed circuitous cavity 18. The periphery of the cavity includes a plurality of notches or recessed portions 20 as can be seen in FIGS. 2, 3 and 4. A bearing hole 22 is centered within the cavity and is designed to receive an axle or a shaft of a gear member. An oblong bearing hole 24 provides a camming surface for a movable gear, to be subsequently described. An additional bearing hole 26 is also provided to rotatably receive another gear shaft. Mounting posts 28 and 30 can be integrally molded with the housing shell 14 and are designed to extend through respective friction fitting holes 32 and 34 in the intermediate plate 12, and holes 36 and 38 in the other shell member 10. Another bearing hole 40 is designed to rotatably receive the output shaft 6 which extends through the corresponding bearing hole 42 in the housing shell 10.

Intermediate plate 12 includes an oblong bearing hole 44 that is complementarily positioned relative to the bearing hole 24 for movably supporting a gear. Another oblong bearing hole 46 having a camming surface corresponds to a complementary oblong bearing hole 48 positioned in housing shell 10. Intermediate plate 12 also has an aperture 54 for supporting the shaft of a dual gear member. Finally, housing shell 10 includes bearing holes 50 and 52 for supporting the shafts of gears.

A spring member 56 has an outer peripheral end 58 bent back upon itself to form a configuration that is complementary to the recessed portion 20 of the housing shell 14. When the spring member 56 expands, it is capable of locking its end 58 in any one of the recessed portions 20. The inner end 60 of the spring member 56 is also bent back upon itself to form an approximately circular loop. This circular loop is configured to interact with a gear shaft 62 that is concentrically located within an integral collar member 64 as can be best seen in FIGS. 3 and 4. A portion of the spring member 56 extends through an opening slot 66 with the inner end 60 thereby locked against any relative movement to provide the second anchor point for the spring member. Relative rotation of one anchor point to the other anchor point will permit the storage or release of spring energy.

The gear train assembly 16 includes a drive pinion 68 mounted on the output shaft 6. This drive pinion 6 is fixedly mounted to mesh with a spur gear 70 that is integrally molded with a second pinion gear 72 mounted on the same axle. A movable idle gear 74 is mounted within the oblong cam bearing holes 46 and 48 of the intermediate plate 12 and the housing shell 10. When rotating in a counterclockwise direction on the right hand side of intermediate plate 12, see FIG. 7, the idle gear 74 engages pinion gear 76 which is fixedly mounted in bearing hole 42 of housing shell 14 and the bearing hole 50 of housing shell 10 to transmit energy ultimately to the spring member 56. Pinion gear 76 can be integrally molded with a large gear 78 and the shaft 62 and collar 64. A dual gear assembly including a pinion gear 80 and a spur gear 82 can be integrally molded with appropriately extending shafts for mounting within the oblong bearing holes 46 and 24 of respectively intermediate plate 12 and housing shell 14.

Referring to FIGS. 5, 7 and 8, and more particularly, the schematic gear arrangement of the gear train assembly 16 shown in FIG. 7, the gears are disclosed in an operative position during the storing of energy by rotation of the output shaft 6 in a counterclockwise direction when viewed from the right hand side. The output shaft 6 rotates to turn the small drive pinion gear 68 which in turn engages and rotates the spur gear 70. Rotation of the spur gear 70 automatically forces the gear 74 to travel along its camming slot to engage and rotate the pinion gear 76. The pinion gear 76 is connected by the shaft 62 to the inner end 60 of the spring member and rotates the same to store energy. During this wind up mode of operation, the large gear 78 rotates in a counterclockwise direction and automatically disengages the spur gear 82 as the pinion gear 80 is driven upward to the furtherest extent of the arcuate oblong bearing holes 24 and 44.

Referring again to FIGS. 5, 6 and 8, and more particularly, FIG. 6, the gear train assembly 16 is disclosed in a drive configuration wherein the spring member is releasing stored energy by rotating shaft 62 and correspondingly the large gear 78. The large gear 78 drives the pinion gear 80 in a clockwise direction to automatically engage spur gear 82 with a second pinion gear 72. Since the second pinion gear 72 is directly connected to the spur gear 70, it rotates at the same speed to drive the pinion gear 68 on the output shaft. As can be appreciated, the rotation of the spur gear 70 forces the idle gear 74 to the end of the bearing holes 48 and 46 and thus, automatically out of engagement with the pinion gear 76.

In assembling the prime mover 2, the housing shell 14 receives within its recessed cavity 18 the spring member 56 as shown in FIGS. 3 and 4. The output shaft 4 is inserted through the bearing hole 40 and a drive pinion gear 68 is inserted on the output shaft. The outer spring end 58 can be easily inserted into any one of the notches 20 in the recess 18 by a simple rotation of the spring member. Thus, there is no necessity of any special alignment of the spring member 56 in the housing.

The shaft 62 and collar 64 are inserted, respectively, through the inner end 60 of the spring member 56 and about the inner spring end 60. This provides the second anchor point for the spring member 56 and also operatively positions the large gear 78 and the pinion gear 76 in the gear assembly 16. The spur gear 82 and pinion gear 80 that are molded together are appropriately mounted within the oblong bearing hole 24 of the shell 14. Likewise, the pair of gears 70 and 72 are mounted for rotation within the bearing hole 26.

The intermediate plate 12 is then assembled onto the pins or mounting posts 28 and 30 with appropriate alignment of the bearing holes 44 and 54. The gear 74 is then mounted in bearing hole 46 and the right housing shell 10 is inserted, with appropriate alignment to support each of the gears, on the mounting posts and the output axle. There is no necessity to use any fasteners or screws since the plastic material permits a friction joining of the parts. A final rear wheel 4 is fastened to the output shaft and the prime mover 2 is completed and ready for assembling into any toy vehicle.

Throughout the present specification, the term "vehicle" has been utilized. However, it should be readily understood that the prime mover is capable of use on numerous small toys to provide a propulsion force. To appreciate the relative size of the motor that we are referring to, its dimensions can be less than one inch by one-half inch.

As can be appreciated from FIG. 6, the rotation of the shaft 62 by the spring member is translated into multiple rotations of the output shaft as a direct function of the gear ratio. As can be readily appreciated, the gear ratios can be subjectively changed by varying the size of the gears. As can be seen in FIG. 7, the windup mode of operation ensures that a relatively small movement of the car, with rotation of the output shaft by the rear wheels, will adequately wind the spring member 56 to its optimum tension. In the arrangement of the gear assembly as presently shown, the release of the toy vehicle after it is wound up will immediately drive the vehicle in a forward direction. Accordingly, the child simply grasps the body of the vehicle and moves it backward for three or four inches to tension the spring member 56. Release of the vehicle will then drive it forward for a considerable distance at a relatively rapid velocity.

As can be readily appreciated, the vehicle can be wound up by a separate key in a conventional fashion by a minor change to the gear train assembly 16. Likewise, a switch could be provided to lock the gear train in a wound up mode of operation, such as providing a pivotal pawl member to restrain a gear from a driving movement in one direction until it is released while still permitting the spring to be tensioned in another direction.

These and other modifications of the present invention could be easily accomplished by a person of ordinary skill once given the generic principles of the present invention. Accordingly, the scope and spirit of the present invention should be determined only from the following claims:

What is claimed is:

1. A spring wound prime mover capable of use in toys and the like comprising:
    a housing member including a first and second shell member, an intermediate plate member that divides the shell members, and a pair of mounting posts that extend from one shell member to the other, one of the shell members has a circuitous cavity with a plurality of recessed positions, the housing shell members are formed from plastic and are held together through the interaction of solely the shell members and the intermediate plate;
    an output shaft rotatably mounted to the housing member;
    a spring member capable of selectively storing and releasing energy to drive the output shaft mounted in the circuitous cavity and being removably anchored to a recessed portion;
    a gear train assembly connected to the spring member and the output shaft and capable of providing a first and a second gear ratio including a first gear movably mounted to be automatically forced into engagement when driven by an external force to provide a first gear ratio for moving the spring member for storing energy and to be automatically forced out of engagement when the spring member drives the output shaft and a second gear movably mounted to be automatically forced into engagement when the spring member drives the output shaft to provide a second gear ratio and to be automatically forced out of engagement when the gear train assembly is driven by an external force for moving the spring member to store energy.

2. The invention of claim 1 wherein the housing shells, plate and gear assembly are formed from plastic.

3. The invention of claim 1 wherein the housing member is formed from plastic and includes a first and second shell and an intermediate plate that are friction fitted together.

4. In a spring wound prime mover having an output shaft for use in driving toys and the like, the improvement comprising:
    a housing member including a cavity with an internal wall having at least one recessed portion, and
    a spring member having an outer circumferential portion of such a configuration to interact with the recessed portion for automatically fixing one end of the spring member to the housing member upon insertion, the other end of the spring member is bent to form an opening therein;
    a shaft of such a dimension to fit within the bent spring end, and
    a collar member having an open slot of such a configuration to extend over the shaft and spring end, with the spring extending through the slot, for fastening the shaft to the spring whereby the other end of the spring member can be moved to permit storing and releasing of energy to the output shaft.

5. The invention of claim 4 further including a gear train assembly connected to the spring member and the output shaft, the output shaft being fixed for rotational movement only relative to the housing member, and capable of automatically providing different gear ratios including a first gear movably mounted to be automatically forced into engagement, when driven by an external force, to provide a first gear ratio for moving the spring member for storing energy and to be automatically forced out of engagement when the spring member drives the output shaft and a second gear movably mounted to be automatically forced into engagement when the spring member drives the output shaft to provide a second gear ratio and to be automatically forced out of engagement, when driven by an external force, for moving the spring member to store energy.

6. A spring wound prime mover capable of use in toys and the like comprising:
    a housing member having an approximately circuitous cavity having an internal wall, the internal wall having at least one recessed portion;
    an output shaft rotatably mounted to the housing member;
    a spring member capable of selectively storing and releasing energy to drive the output shaft, the spring member having an outer circumferential portion of such a configuration to interact with the recessed portion for automatically fixing one end of the spring member to the housing member whereby the other end is bent to form an opening, and the spring member can be moved to provide a manner of storing and releasing energy to the output shaft; and
    a gear train assembly connected to the spring member and the output shaft and capable of providing a first and a second gear ratio including a shaft of such a dimension to fit within the open bent spring end, a collar member having an open slot of such a configuration to extend over the shaft and spring end, with the spring member extending through the slot, for fastening the shaft to the spring member, a first gear movably mounted to be automatically forced into engagement when driven by an external force to provide a first gear ratio for moving the spring member for storing energy and to be automatically forced out of engagement when the spring member drives the output shaft and a second gear movably mounted to be automatically forced into engagement when the spring member drives the output shaft to provide a second gear ratio and to be automatically forced out of engagement when the gear train assembly is driven by an external force for moving the spring member to store energy.

7. The invention of claim 6 wherein the housing member includes a pair of housing shells positioned on either side of a housing plate member.

8. The invention of claim 7 wherein mounting posts extend from one housing shell to another and the housing shells and plate are held together by friction alone.

* * * * *